United States Patent Office 3,231,473
Patented Jan. 25, 1966

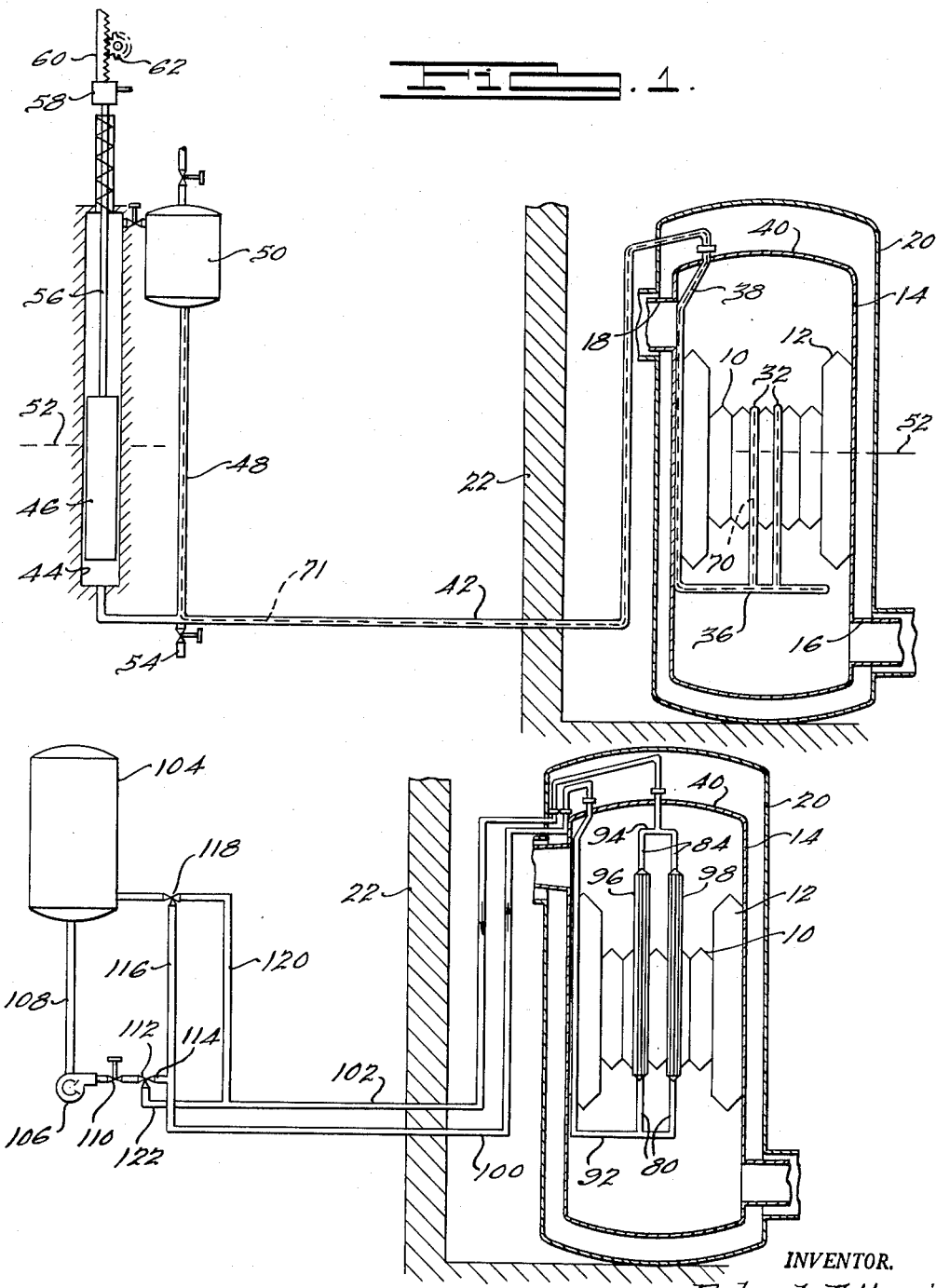

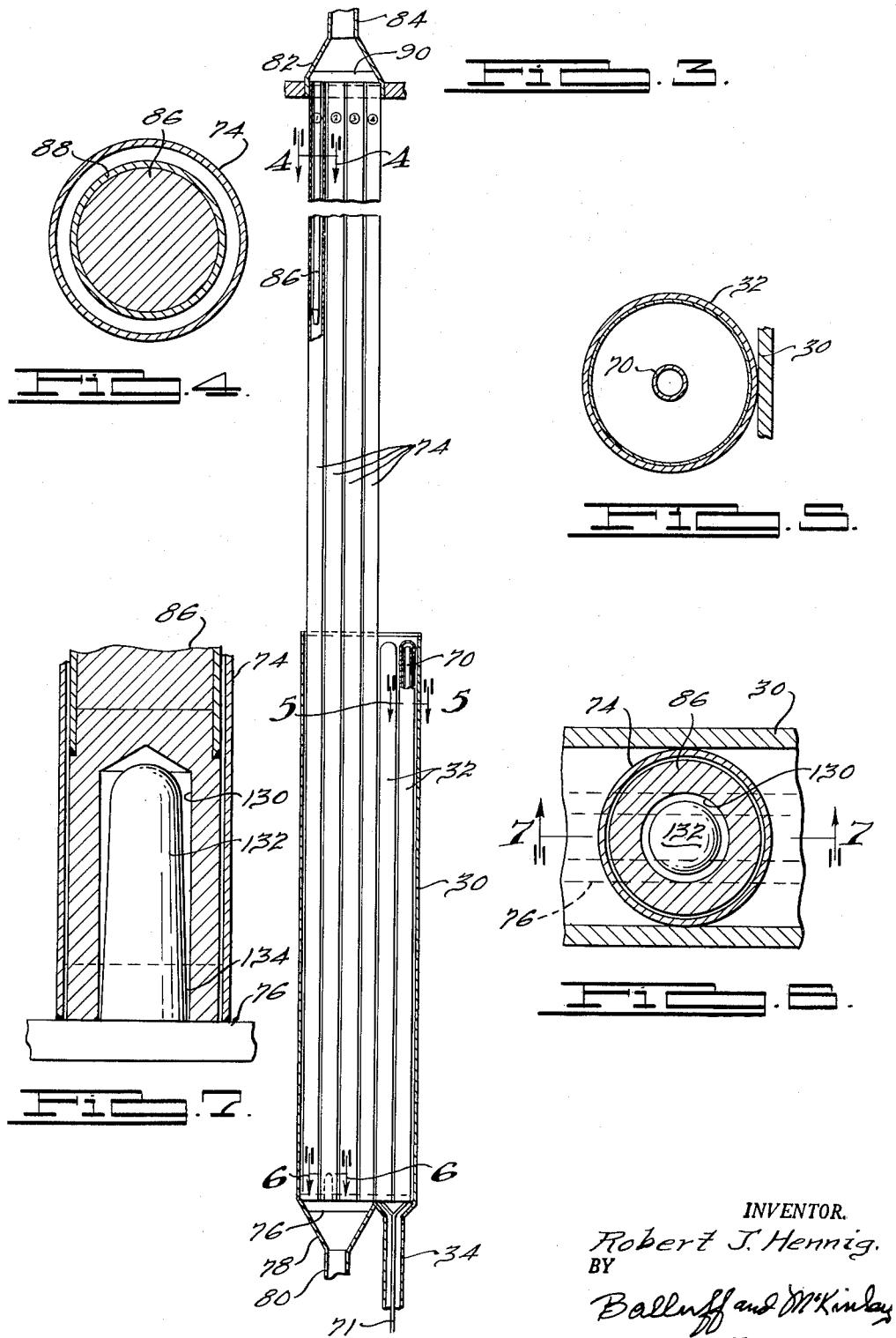

1

3,231,473
NUCLEAR REACTOR CONTROL SYSTEM
Robert J. Hennig, Pontiac, Mich., assignor to Atomic Power Development Associates, Inc., Detroit, Mich., a corporation of New York
Filed Mar. 31, 1960, Ser. No. 19,011
4 Claims. (Cl. 176—36)

This invention relates to nuclear reactors and has particular reference to an improved control system for a nuclear reactor. The present invention contemplates a novel operating control system for controlling the reactivity of a reactor and also contemplates a novel safety control system for shutting down the reactor or for immediately stopping the nuclear reaction under emergency conditions.

According to the present invention the operating control system consists of a liquid poison material and a means to regulate the level of the liquid poison within the reactor core to control the reactivity of the reactor.

The safety control system of this invention, in general, comprises a plurality of rods of poison material such as boron or the like which are located within hollow tubes extending through the reactor core and a means for pumping liquid sodium upwardly through the tubes to hold the safety rods above the reactor core during normal operation of the reactor. A means is provided for controlling the sodium flow rate so that the rods may be allowed to drop gradually into the reactor core to terminate the chain reaction or, under emergency conditions, the direction of flow of sodium may be reversed so as to drive the safety rods into the reactor core at high velocity to immediately terminate the chain reaction.

The operating and control systems disclosed herein may be employed in any type of nuclear reactor, for example, a reactor of the kind shown in the copending application Serial No. 19,008, filed on March 31, 1960, assigned to the assignee of this invention and filed concurrently herewith, a portion of such reactor being schematically illustrated herein.

A principal object of the invention is to provide a new and improved operating control system for a nuclear reactor.

Another object of the invention is to provide a new and improved safety control system for a nuclear reactor.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIG. 1 is a schematic illustration of the operating control system;

FIG. 2 is a schematic illustration of the safety control system;

FIG. 3 is a sectional view through one of the control assemblies employed in a reactor embodying the safety and control systems of the present invention;

FIG. 4 is a sectional view taken on line 4—4 of FIG. 3;

FIG. 5 is a sectional view taken on line 5—5 of FIG. 3;

FIG. 6 is a sectional view taken on line 6—6 of FIG. 3; and

FIG. 7 is a sectional view taken on line 7—7 of FIG. 6.

The operating control system is illustrated schematically in FIG. 1 in connection with a nuclear reactor which may be of the type disclosed in the above-mentioned copending application and which includes a core section 10 and a radial blanket section 12 contained within a reactor vessel 14 having an inlet 16 at its lower end for the flow of a coolant such as liquid sodium upwardly through the reactor to an outlet 18 at the upper end of the containment vessel 14. A secondary containment vessel is indicated at 20, and suitable shielding 22 may be employed as is customary.

FIG. 3 illustrates one of a series of control assemblies which may be located within the reactor core 10. The number of control assemblies and their particular location within the core may be varied according to the design of the reactor in which the control systems are used. As shown in FIG. 3, each control assembly comprises a generally rectangular vertically disposed shell 30 which may be secured within the core of the reactor in any suitable manner such as by securing the same to the adjacent fuel subassemblies making up the reactor core 10. The control assembly includes a pair of operating control tubes 32 closed at their upper ends and open at their lower ends to communicate with a pipe 34 leading to a header 36. A pipe 38 extends from the header 36 upwardly along the inside wall of the reactor vessel and passes out through the head 40 of the reactor vessel and through the secondary containment tank 20. A pipe 42 connected to the pipe 38 leads to the lower end of a cylinder 44 containing a piston 46 which is loosely fitted within the cylinder 44. A line 48 leads from the pipe 42 to the lower end of a collection and purge tank 50. The entire system thus far described is filled with a liquid poison material such as lithium-6, and the liquid is normally maintained within the cylinder 44 and the operating control tubes 32 at the level indicated by the line 52 in FIG. 1. The system may be filled and drained by means of a valve 54.

The piston 46 is provided with a piston rod 56 which is connected at its upper end to a gas cylinder actuating device 58 and to a rack 60 meshed with a pinion 62 which may be driven when required through an electric motor or other power source, not shown. The level of the liquid lithium is adjusted as required by moving the piston 46 downwardly within the cylinder 44 when the level is to be raised to decrease the reactivity of the reactor and by raising the piston 46 when the liquid level is to be lowered to increase the reactivity. The gas cylinder 58 may be connected to a suitable source of hydraulic pressure, not shown, so that the piston rod 56 may be moved upwardly or downwardly as required upon proper connection of the cylinder 58 to the source of pressure. The cylinder 58 may be employed for relatively short and rapid strokes of the piston 46 to obtain small variations of the volume of the poison material within the reactor core. The pinion 62 and the rack 60 may be employed for obtaining longer and slower strokes of the piston 46. The rack 60 is secured to the cylinder 58 so that movement of the rack imparts movement to the piston rod 56 and the piston 46.

The control tubes 32 may be made of stainless steel provided with a coating of columbium on all interior surfaces to prevent corrosion of the tubes by the poison material. A small diameter tube 70 is disposed within each of the operating control tubes 32. The tubes 70 are open at their upper ends which terminate adjacent the closed upper ends of the tubes 32. The tubes 70 within each pair of operating control tubes 32 are joined at their lower ends into a single tube 71 which passes through the pipe 34 and connects into a similar small diameter tube located within the header 36 and passing through the pipes 38, 42 and 48 back to the collection and purge tank 50. The tubes 70 and 71 may be made of columbium or other material resistant to corrosion by the lithium or other poison material and are indicated by the dotted lines in FIG. 1. The tubes 70 and 71 are designed to carry off any helium that may collect in the upper ends of the control tubes 32 due to neutron absorption in the lithium and are also designed to equalize the pressure within the several tubes making up the operating control system.

The safety control system is illustrated schematically in FIG. 2 and is shown in conjunction with a reactor of the kind previously described. As shown in FIG. 3, each control assembly includes a plurality of elongated vertically disposed tubes 74 with the lower portions of the tubes 74 located within and supported by the shell 30. The tubes 74 are supported at their lower ends on a support plate 76 which extends across the upper end of a header 78 connected to a supply pipe 80. Each group of tubes 74 is provided with an outlet header 82 connected to an outlet pipe 84.

A poison rod 86 is disposed within each of the tubes 74 and may consist of a slug or rod of solid boron carbide in a perforated stainless steel jacket. The rods 86 are of smaller diameter than the inside diameter of their respective tubes 74 to provide a clearance between the rods 86 and the tubes 74. A retaining plate 90 extends across the outlet header 82 to limit upward travel of the rods 86. The supply pipes 80 of adjacent groups of safety control tubes are connected to a common supply header 92, while the outlet pipes 84 of adjacent groups of tubes are connected to a common outlet header 94. Two groups of tubes 74 are illustrated schematically in FIG. 2, one group of tubes being indicated at 96 and the other at 98, with the two groups of tubes 96 and 98 having common inlet and outlet headers 92 and 94.

Each two groups of safety control tubes 96 and 98 are connected into a closed circuit, as illustrated in FIG. 2. The inlet header 92 is connected to an inlet pipe 100, while the outlet header 94 is connected to a return line 102. The system includes a storage tank 104 and a pump 106 having its inlet connected to a line 108 leading from the tank 104 and its outlet connected to the supply line 100 through a shut-off valve 110 and a three-way valve 112. During normal operation of the reactor the valve 110 is open and the valve 112 is set so that liquid sodium or other suitable material contained within the tank 104 will be supplied from the pump 106, past valve 112 to line 114 which opens into a line 116 connected at its lower end to the inlet pipe 100 and at its upper end to a three-way valve 118, the latter preventing flow through line 116 under normal operating conditions. The liquid sodium is thus pumped upwardly through the tubes 74 and is returned through the return line 102, a line 120, past valve 118 into the tank 104, and back to the pump 106 through line 108.

The sodium is circulated by the pump 106 at such a rate as to maintain the poison rods 86 at the upper ends of the tubes 74 where they engage the retaining plate 90, the rods being held against downward movement by the upward flow of sodium through the tubes 74. The rods 86 closest to the center of the reactor core may have a greater clearance within their tubes 74 than the remaining rods 86, and such clearance may be progressively decreased from the radially innermost rods 86 to those more remote from the center of the reactor core. Thus, in the event of a reactor shutdown, the velocity of the sodium flow may be decreased so that the innermost rods 86 will fall into the reactor core first and as the flow velocity is further decreased, the remaining rods 86 will drop by gravity until the reactor is completely shut down.

In the event of an emergency condition the direction of flow through the circuit may be reversed by manipulation of valves 112 and 118. In such case the rods 86 will be immediately driven downwardly into the reactor core to terminate the chain reaction. When the positions of the valves 112 and 118 are reversed, the line 114 is closed by valve 112 and a line 122 is opened, thereby connecting the return line 102 to the pump outlet. Line 120 is closed by valve 118 at such time, while line 116 is opened through the valve 118, thereby obtaining an immediate reversal of flow in the lines 100 and 102 to drive the safety rods into the reactor core.

As shown in FIG. 7, each of the safety rods 86 is provided at its lower end with an upwardly opening recess 130 forming a dashpot chamber. The lower support plates 76 are provided with tapered plugs 132 which extend upwardly therefrom in axial alignment with each of the safety rods 86. This arrangement provides a dashpot or decelerating effect to the rods 86 as they reach the lower ends of the tubes 74. The liquid sodium within the dashpot chamber 130 must be forced out past the restricted annular opening 134 between the wall of the chamber 130 and the tapered plug 132, thereby slowing down the rod and cushioning the same as it reaches its lowermost position against the support plate 76.

The safety control rods are thus hydraulically actuated and controlled rather than being actuated by mechanical devices. The operating control system likewise is a hydraulic system rather than employing solid rods which must be moved by mechanical actuating devices into and out of the reactor core. This arrangement possesses many advantages such as elimination of the necessity of mounting mechanical actuating devices in axial alignment with solid rods at the top or bottom of the reactor. With the hydraulic systems disclosed herein, the piping may enter and leave the reactor vessel at any arbitrary point and the actuating mechanisms may be located outside of the reactor vessel while maintaining the operating and safety controls in the most effective position thereof within the reactor core. While only a single safety control circuit has been illustrated, it is contemplated that two or more independently operable safety control circuits may be employed in the reactor to provide an added safety factor in the event of failure of one of the systems.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In a nuclear reactor having an active core portion capable of sustaining a controlled nuclear fission chain reaction, a control system for the reactor comprising means defining a closed path for the circulation of a liquid therethrough, a portion of said closed path within the reactor vessel comprising a plurality of vertical passages extending upwardly through and above said active core portion and disposed across said active core portion, a rod-shaped poison member disposed in each of said passages, each said rod-shaped member having an outside diameter less than the inside diameter of its respective passage to provide clearance for the flow of liquid through said passages, means for circulating a liquid in said closed path upwardly through said vertical passages at such velocity as to normally hold said rod-shaped poison members in the upper end of said passages above said active core portion, means for controlling the flow of liquid through said closed path to regulate the elevation of said rod-shaped poison members in said passages and regulating means operable to reverse the direction of liquid flow through said passages to drive said rod-shaped members downwardly therein into said active core portion, and wherein the relative outside diameter of said rod-shaped poison members and the inside diameter of their respective passages is such as to provide greater clearance between said members and their passages adjacent the effective center of the active core portion than between said members and their passages adjacent the periphery of said active core portion, whereby in response to a reduction in the rate of flow of liquid upwardly through said passages those rod-shaped poison members adjacent the center will precede those rod-shaped poison members adjacent the periphery downwardly into said active core member.

2. In a nuclear reactor having an active core portion capable of sustaining a controlled nuclear fission chain reaction, a control system for the reactor comprising means defining a closed path for the circulation of a liquid therethrough, a portion of said closed path within the reactor vessel comprising a plurality of vertical passages extending upwardly through and above said active core portion and disposed across said active core portion, a rod-shaped poison member disposed in each of said passages, each said rod-shaped member having an outside diameter less than the inside diameter of its respective passage to provide clearance for the flow of liquid through said passages, means for circulating a liquid in said closed path upwardly through said vertical passages at such velocity as to normally hold said rod-shaped poison members in the upper end of said passages above said active core portion, means for controlling the flow of liquid through said closed path to regulate the elevation of said rod-shaped poison members in said passages and regulating means operable to reverse the direction of liquid flow through said passages to drive said rod-shaped members downwardly therein into said active core portion, and wherein the relative outside diameter of said rod-shaped poison members and the inside diameter of their respective passages is such as to provide greater clearance between said members and their passages adjacent the effective center of the active core portion than between said members and their passages adjacent the periphery of said active core portion, whereby in response to a reduction in the rate of flow of liquid upwardly through said passages those rod-shaped poison members adjacent the center will precede those rod-shaped poison members adjacent the periphery downwardly into said active core member, the clearance between said rod-shaped poison members and their respective passage members decreasing radially outwardly from the center of said active core portion.

3. In a nuclear reactor having an active core portion capable of sustaining a controlled nuclear fission chain reaction, a control system for the reactor comprising means defining a closed path for the circulation of a liquid therethrough, a portion of said closed path within the reactor vessel comprising a plurality of upstanding passages extending upwardly through and above said active core portion and disposed across said active core portion, a rod-shaped poison member disposed in each of said passages, each said rod-shaped member having an outside diameter less than the inside diameter of its respective passage to provide clearance for the flow of liquid through said passages, means for circulating a liquid in said closed path upwardly through said upstanding passages at such velocity as to normally elevate and hold said rod-shaped poison members in the upper part of said passages above said active core portion, means for selectively controlling the flow of liquid through said closed path to regulate the elevation of said rod-shaped poison members in said passages and regulating means operable to reverse the direction of liquid flow in said closed path and through said passages to drive said rod-shaped members downwardly therein into said core portion.

4. A control system according to claim 3 including means at the lower end of each of said tubes disposed in said closed path, and defining a restricted orifice for the reverse flow of said liquid therepast in said closed path whereby the downward movement of said rod is cushioned as said rod approaches the lower end of its associated tube.

References Cited by the Examiner

UNITED STATES PATENTS

| | | | |
|---|---|---|---|
| 2,773,823 | 12/1956 | Goett | 204—193.2 |
| 2,816,068 | 12/1957 | Ruano | 204—193.2 |
| 2,857,324 | 10/1958 | De Boisblanc | 204—154.3 |
| 2,880,155 | 3/1959 | Lichtenberger et al. | 204—193.2 |
| 2,917,444 | 12/1959 | Dreffin | 204—193.2 |
| 2,937,984 | 5/1960 | Chapellier | 204—193.3 |
| 2,982,712 | 5/1961 | Heckman | 204—193.3 |
| 2,990,356 | 6/1961 | Chapellier et al. | 204—154.3 |

FOREIGN PATENTS

| | | |
|---|---|---|
| 612,009 | 1/1961 | Canada. |
| 1,211,272 | 10/1959 | France. |
| 1,052,000 | 3/1959 | Germany. |

OTHER REFERENCES

"Peaceful Uses of Atomic Energy, United Nations Conference," 1955, vol. 3, pages 160–161.

"Chemical Engineers' Handbook," by John Perry, McGraw-Hill Co., 1950, page 408.

LEON D. ROSDOL, *Primary Examiner.*

ROGER L. CAMPBELL, REUBEN EPSTEIN, CARL D. QUARFORTH, *Examiners.*

A. T. DAVIS, J. F. DAVIS, M. R. DINNIN, *Assistant Examiners.*